United States Patent
Mathew et al.

(10) Patent No.: US 11,993,721 B2
(45) Date of Patent: May 28, 2024

(54) LED ENERGY CURABLE INK COMPOSITIONS

(71) Applicant: SUN CHEMICAL CORPORATION, Parsippany, NJ (US)

(72) Inventors: Mathew C. Mathew, Carlstadt, NJ (US); David Biro, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/020,532

(22) PCT Filed: Jul. 28, 2021

(86) PCT No.: PCT/US2021/043384
§ 371 (c)(1),
(2) Date: Feb. 9, 2023

(87) PCT Pub. No.: WO2022/055625
PCT Pub. Date: Mar. 17, 2022

(65) Prior Publication Data
US 2023/0303868 A1    Sep. 28, 2023

Related U.S. Application Data

(60) Provisional application No. 63/076,417, filed on Sep. 10, 2020.

(51) Int. Cl.
| | | |
|---|---|---|
| C09D 11/101 | (2014.01) | |
| B41M 5/52 | (2006.01) | |
| C08F 2/46 | (2006.01) | |
| C08F 2/50 | (2006.01) | |
| C08G 61/04 | (2006.01) | |
| C09D 11/107 | (2014.01) | |

(52) U.S. Cl.
CPC .......... *C09D 11/101* (2013.01); *B41M 5/5209* (2013.01); *C09D 11/107* (2013.01)

(58) Field of Classification Search
CPC .............. C08F 2/46; C08F 2/50; C08G 61/04
USPC .............. 106/31.13; 522/6, 71, 1, 189, 184; 520/1
See application file for complete search history.

(56) References Cited

U.S. PATENT DOCUMENTS

2012/0015159 A1    1/2012    Herlihy et al.

FOREIGN PATENT DOCUMENTS

| GB | 2 561 984 A | | 10/2018 | |
|---|---|---|---|---|
| GB | 2573207 | * | 10/2019 | |
| WO | WO 2015/022228 A1 | | 2/2015 | |
| WO | WO-2015022228 A1 | * | 2/2015 | ........... B41J 11/002 |
| WO | WO 2018/146259 A1 | | 8/2018 | |
| WO | WO 2018/146494 A1 | | 8/2018 | |
| WO | WO 2018/146495 | | 8/2018 | |
| WO | WO-2018146259 A1 | * | 8/2018 | ........... B41J 11/002 |
| WO | WO 2019/077364 | | 4/2019 | |
| WO | WO 2021/099145 A1 | | 5/2021 | |

OTHER PUBLICATIONS

International Search Report issued in International Application No. PCT/US2021/043384, dated Nov. 11, 2021.
Written Opinion of the International Searching Authority issued in International Application No. PCT/US2021/043384, dated Nov. 11, 2021.
International Preliminary Report on Patentability (Chapter 1 of the Patent Cooperation Treaty) issued in International Application No. PCT/US2021/043384, dated Sep. 23, 2022.
Esselbrugge, Hilbert, "Integrating the photoinitiator self-initiating resins produce UV coatings with few extractables."European Coatings Journal (2007), (6), 60-63).
Gould, Michael L. Et al. RadTech Europe 05: UV/EB—Join the Winning Technology, [Conference Proceedings], Barcelona, Spain, Oct. 18-20, 2005, 1, 245-251.
Decker, C. "Photoinitiated curing of multifunctional monomers." Acta Polymerica (1994), 45(5), 333-347.
Decker, Christian, et al. "A new class of highly reactive acrylic monomers. 2. Light-induced copolymerization with difunctional oligomers." Makromolekulare Chemie (1991), 192(3), 507-522.
Decker, C. Et al. "Photopolymerization of functional monomers. VII. Evaluation of the rate constants of propagation and termination." European Polymer Journal (1995), 31(12), 1155-63.
Zhen, Wenyuan; Li, et al. "Preparation and properties of functional UV curable monomers." Tuliao Gongye (2009), 39(8), 15-19, 23.

* cited by examiner

*Primary Examiner* — Jessica Whiteley
(74) *Attorney, Agent, or Firm* — Marian E. Fundytus; Ostrolenk Faber LLP.

(57) ABSTRACT

The present invention provides energy curable compositions that are curable using UV LED radiation. The compositions comprise vinyl methyl oxazolidinone (VMOX), as well as other components generally found in energy curable inks, such as ethylenically unsaturated monomers (in addition to VMOX), acrylated oligomers, and photoinitiators. The compositions are suitable for high speed flexographic or gravure printing.

20 Claims, No Drawings

LED ENERGY CURABLE INK COMPOSITIONS

CROSS REFERENCE TO RELATED APPLICATIONS

The present application is a § 371 National Phase application based on PCT/US2021/043384 filed Jul. 28, 2021, which claims the benefit of U.S. Provisional Application No. 63/076,417, filed on Sep. 10, 2020, the subject matter of each of which is incorporated by reference in their entirety.

FIELD OF THE INVENTION

The present invention relates to inks that are curable by UV LED radiation, at high press speeds. The inks comprise vinyl methyl oxazolidinone (VMOX), as well as other components generally found in energy curable inks, such as ethylenically unsaturated monomers (in addition to VMOX), acrylated oligomers, and photoinitiators.

BACKGROUND OF THE INVENTION

Conventional systems for curing energy curable compositions, such as mercury vapor lamps, are associated with several unwanted effects. For example, traditional UV lamps generate heat that can cause distortion of the substrate, generate of ozone, and there are hazards associated with the disposal of UV mercury vapor lamps.

In recent years, UV LED (light emitting diode) chip technology has grown considerably in power and efficiency at wavelengths important for photo-polymerization of UV-sensitive inks, coatings, and adhesives. The emergence of high brightness UV LED chips has quickly enabled the development of a new class of LED UV lamp curing luminaire systems, and architectures with radiant power and intensity that rival the output of traditional UV lamps, but without the unwanted side effects that have restriction the adoption of conventional UV technology.

With the adoption of the new technology, there is a need for UV LED optimized inks capable of faster reactions under the most powerful LED UV wavelengths, typically between 385 nm and 395 nm. However, most of the commercially available ink systems are not suitable with today's faster press speeds.

Most conventional UV ink systems will not cure when exposed to UV LED lamps (typically 385-395 nm). To cure under UV LED lamps, the inks must be optimized. This involves the proper selection of monomers, oligomers, photoinitiator, and additives. Most commercially available UV LED ink systems suffer from lack of cure at higher press speeds.

US 2012/0015159 describes cyclic carbamate compounds which are the reaction product of a cyclic carbamate having an acrylate functional group with an aliphatic amine compound. The cyclic carbamate compounds are useful as oxygen scavengers in energy-curable compositions.

WO 2018/146495 discloses an inkjet ink comprising: isobornyl acrylate; an N-vinyl amide monomer, an N-acryloyl amine monomer, and/or an N-vinyl carbamate monomer; a passive resin; a radical photoinitiator; optionally a difunctional (meth)acrylate monomer; and optionally a colorant.

WO 2019/077364 describes an inkjet ink comprising one or more (meth)acrylate monomers, an N-vinyl carbamate monomer, a dispersed pigment, and a radical photoinitiator.

Esselbrugge et al. disclose self-initiating resins prepared by Michael addition of acrylate monomers/oligomers with beta-ketoesters or beta-diketones (Integrating the photoinitiator-self-initiating resins produce UV coatings with few extractables. By Esselbrugge, Hilbert. From European Coatings Journal (2007), (6), 60-63). Gould et al. teach UV-curable resins that contain a stable photoactive chromophore that becomes part of the resin/oligomer structure through the Michael reaction between beta-diketones, beta-ketoesters, and/or beta-ketoamides with common acrylates (Novel self-initiating UV-curable resins: generation three. By Gould, Michael L.; Narayan-Sarathy, Sridevi; Hammond, Terry E.; Fechter, Robert B. From RadTech Europe 05: UV/EB—Join the Winning Technology, [Conference Proceedings], Barcelona, Spain, Oct. 18-20, 2005 (2005), 1, 245-251).

Several groups have prepared acrylate monomers that contain cyclic carbonate, carbamate, or oxazolidone functional groups (A new class of highly reactive acrylic monomers. 2. Light-induced copolymerization with difunctional oligomers. By Decker, Christian; Moussa, Khalil. From *Makromolekulare Chemie* (1991), 192(3), 507-22; Photoinitiated curing of multifunctional monomers. By Decker, C. From *Acta Polymerica* (1994), 45(5), 333-47; Photopolymerization of functional monomers. VII. Evaluation of the rate constants of propagation and termination: (*European Polymer Journal* (1995), 31(12), 1155-63). By Decker, C.; Elzaouk, B; Preparation and properties of functional UV curable monomers: By Zhen, Wenyuan; Li, Yunqing; Zhou, Hongyong; Wang, Jiaxi. From *Tuliao Gongye* (2009), 39(8), 15-19, 23). These monomers are highly reactive, and exhibit improved cure compared to conventional acrylate monomers.

Thus, there is still a need in the art for inks, coatings, adhesives, and the like, that cure under UV LED light at high press speeds.

BRIEF SUMMARY OF THE INVENTION

The present invention provides energy curable compositions, for example inks, that after UV LED curing exhibit good cure, printability, low migration solvent rub resistance, and adhesion to flexible substrates. Substrates include, but are not limited to, films used for food packaging and labelling of commercial articles.

In a particular aspect, the present invention provides an energy curable composition, comprising:
   (a) 1 wt % to 20 wt % vinyl methyl oxazolidinone monomer, based on the total weight of the composition;
   (b) 1 wt % to 30 wt % one or more additional ethylenically unsaturated monomers, based on the total weight of the composition;
   (c) 1 wt % to 30 wt % one or more acrylated oligomers, based on the total weight of the composition; and
   (d) 1 wt % to 20 wt % one or more photoinitiators, based on the total weight of the composition;
wherein the energy curable composition is curable by UV LED radiation.

In another aspect, the energy curable composition is a technical varnish composition, an ink composition, or a coating composition. In certain embodiments, the compositions are suitable for flexographic or gravure printing.

The present invention also provides a method of printing a substrate with the energy curable compositions of the invention, and the substrate prepared by the method. Also provided is an article, such as food packaging, comprising the printed substrate.

These and other objects, advantages, and features of the invention will become apparent to those persons skilled in the art upon reading the details of the formulations and methods as more fully described below.

DETAILED DESCRIPTION OF THE INVENTION

The present invention provides energy curable compositions, such as inks, that are curable by UV LED radiation, and that exhibit good cure, printability, low migration, solvent rub resistance, and adhesion to flexible substrates, such as films used for food packaging and labelling of commercial articles. The energy curable compositions of the invention are suitable for flexographic and gravure, but can be used in any printing or coating method. In certain embodiments, the energy curable compositions of the present invention preferably contain a polymerizable compound, photoinitiators, and optical brightening agents. The photoinitiators preferably contain an acyl phosphine-based initiator having a phenyl group in its molecule, and an optical brightening agent in a concentration sufficient to provide a higher maximum absorbance than the photoinitiator alone (at the same concentration) in the wavelength region of 360 to 420 nm.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "inks and coatings," "inks," and "coatings" are used interchangeably, and refer to compositions of the invention, or, when specified, compositions found in the prior art (comparative). Inks and coatings typically contain resins, solvent, and, optionally, colorants. Coatings are often thought of as being colorless or clear, while inks typically include a colorant.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention.

As used herein, "energy-curable" refers to a composition that can be cured by exposure to one or more types of actinic radiation. Compositions of the current invention are especially suited for use in compositions curable under the action of UV light and/or electron-beam.

As used herein, "(meth)acrylate" and "(meth)acrylic acid" include both acrylate and methacrylate, and acrylic acid and methacrylic acid.

As used herein, "monomer" refers to a small molecule having one or more functional groups. Monomers react with other monomers, either the same or different, to form monomer chains (oligomers and/or polymers). Each monomer in a chain is a monomer repeating unit. A monomer is the smallest unit that makes up an oligomer or a polymer. A monomer is a low molecular weight molecule, usually less than or equal to 100 Daltons weight average molecular weight (Mw).

As used herein, "oligomer" refers to a chain of a few monomer repeating units. Oligomers are a few to several monomer units long chains, and have a mid-range weight average molecular weight of about 100 Daltons to about 10,000 Daltons.

As used herein, "polymer" refers to a large molecule, containing multiple monomer and/or oligomer repeating units. Polymers are high molecular weight molecules, having a weight average molecular weight of greater than about 10,000 Daltons.

As used herein, "monofunctional" means having one functional group.

As used herein, "multifunctional" means having two or more reactive (meth)acrylic groups. A multifunctional monomer, for example, can be di-functional, tri-functional, tetra-functional, or have a higher number of functional groups.

As used herein, "double bond conversion," "DBC" and "% DBC" describe the percentage of carbon-carbon double bonds (—C═C—) that are converted to single bonds (—C—C—), or the extent to which all of the monomers and/or oligomers are converted to polymer, when the compositions of the invention are printed on a substrate and cured.

Compositions and Use Thereof

Although the inks of the present invention may be applicable for various types of printing (e.g. inkjet, screen, flexographic, gravure, etc.), they are particularly suited for flexographic and gravure printing. They are specifically suited for high speed flexographic and gravure printing. High speed flexographic and gravure printing generally refers to equal to or greater than 600 feet/min (~182.88 m/min), more preferably greater than 750 feet/min (~228.6 m/min).

The energy curable compositions of the invention comprise vinyl methyl oxazolidinone (VMOX) monomer. Inclusion of VMOX in the compositions results in compositions, such as inks, that have several advantages. For example, the compositions can be cured at high press speeds using 395 nm UV LED lamps. The cured inks have good chemical resistance as indicated by solvent rubs. The cured inks exhibit low migration levels of unreacted monomers, photodegradation products, etc. after curing on a substrate. The compositions of the invention are suitable for applications where it is necessary to minimize contaminants in the products or the environment, such as for food, pharmaceutical, and cosmetic packaging, personal care items, and the like. The cured inks have good adhesion, as demonstrated by the tape adhesion test, to a variety of polymeric substrates.

The energy curable compositions of the present invention typically comprise VMOX in an amount of about 1 wt % to about 20 wt %, based on the total weight of the composition. For example, VMOX may be present in an amount of about 1 wt % to about 15 wt %, based on the total weight of the composition; or about 1 wt % to about 15 wt %; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

The energy curable compositions comprise one or more additional (i.e. in addition to the VMOX) ethylenically unsaturated monomers.

Examples of suitable monofunctional ethylenically unsaturated monomers include, but are not limited to, the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl caprolactam; N-vinyl oxazolidinone and N-vinyl pyrrolidone, and secondary or tertiary acrylamides such as N-acryloyl morpholine; diacetone acrylamide; N-methyl acrylamide; N-ethyl acrylamide; N-isopropyl acrylamide; N-t-butyl acrylamide; N-hexyl acrylamide; N-cyclohexyl acrylamide; N-octyl acrylamide; N-t-octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

The additional ethylenically unsaturated monomers may include one or more additional acrylate functional monomers having carbonate ester, carbamate, or oxazolidinone groups, in addition to acrylate functionality. These include, but are not limited to, N-vinyl pyrrolidone and N-vinylcaprolactam.

The additional ethylenically unsaturated monomers are typically present in the energy curable compositions of the present invention in an amount of about 1 wt % to 30 wt %, based on the total weight of the composition. For example, the additional ethylenically unsaturated monomers may be present in an amount of about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 30 wt %; or about 10 wt % to about 25 wt %; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %.

Although acylphosphine oxide (APO) photoinitiators are preferred, there is no restriction on the type, blend or concentration of photoinitiator used and can include any suitable type of photoinitiators, such as, but not limited to: α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenonelaurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenyl sulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

The energy curable compositions of the present invention may also contain one or more amine synergists that are typically included in the energy curable compositions of the invention. Amine synergists act synergistically with Type II photoactive moieties to enhance cure. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and Neo-Rad P-85 all available from DSM-AGI.

UV sensitizers may also be included in the energy curable compositions of the present invention. Typical sensitizers include thioxanthones, anthracenes, naphthalenes, perylenes, and any of the sensitizers detailed in U.S. Pat. Nos. 6,313,188 and 8,785,515.

The energy curable compositions of the present invention typically contain photoinitiators in an amount of about 1 wt % to about 20 wt %, based on the total weight of the composition. For example, photoinitiators may be present in an amount of about 1 wt % to about 15 wt %, based on the total weight of the composition; or about 1 wt % to about 15 wt %; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

The energy curable compositions of the present invention may also comprise one or more colorants. Where the compositions of the present invention require colourants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 1, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Colorants are typically provided as colorant dispersions. When present, colorant dispersions are typically included in the compositions of the present invention in an amount of about 35 wt % to about 50 wt %, based on the total weight of the composition. For example, colorant dispersions may be present in an amount of about 35 wt % to about 45 wt %; or about 35 wt % to about 40 wt %; or about 40 wt % to about 50 wt %; or about 40 wt % to about 45 wt %; or about 45 wt % to about 50 wt %.

In certain embodiments, the energy curable compositions may comprise one or more optical brighteners (i.e. optical brightening agents). Optical brighteners, optical brightening agents (OBAs), fluorescent brightening agents (FBAs), or fluorescent whitening agents (FWAs), are chemical compounds that absorb light in the ultraviolet and violet region (usually 340-370 nm) of the electromagnetic spectrum, and re-emit light in the blue region (typically 420-470 nm) by fluorescence. Suitable optical brighteners include, but are not limited to: bis-benzoxazoles; coumarins; stilbenes, including triazine-stilbene, and biphenyl stilbenes; diazoles; triazoles; benzoxazolines; combinations thereof; and the like. Fluorescent brighteners are preferred. In some embodiments, optical brighteners act as a sensitizer. Commercially available optical brighteners include, but are not limited to, Optiblanc PL (3V Sigma); Benetex OB, OB Plus, and OB-M1 (Mayzo).

When present, the compositions of the invention comprise optical brighteners in an amount of about 0.1 wt % to about 2 wt %, based on the total weight of the composition. For example, optical brighteners may be present in an amount of about 0.1 wt % to about 1.5 wt %; or about 0.1 wt % to about 1 wt %; or about 0.1 wt % to about 0.5 wt %; or about 0.5 wt % to about 2 wt %; or about 0.5 wt % to about 1.5 wt %; or about 0.5 wt % to about 1 wt %; or about 1 wt % to about 2 wt %; or about 1 wt % to about 1.5 wt %; or about 1.5 wt % to about 2 wt %.

In certain embodiments, the energy curable compositions of the present invention may comprise one or more waxes. Suitable waxes include, but are not limited to, amide wax, erucamide wax, polypropylene wax, paraffin wax, polyethylene wax, polytetrafluoroethylene wax, carnauba wax and the like. The wax may be a combination of said waxes. It is preferred that the wax be a blend of amide and erucamide waxes.

When present, the energy curable compositions of the present invention typically comprise waxes in an amount of about 0.1 wt % to about 5 wt %, based on the total weight of the composition. For example, the energy curable compositions may comprise about 0.1 wt % to about 1 wt % one or more waxes; or about 0.1 wt % to about 0.5 wt %; or about 0.5 wt % to about 5 wt %; or about 0.5 wt % to about 1 wt %; or about 1 wt % to about 5 wt %.

In some embodiments, the energy curable compositions and inks of the present invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, silicones and organic polymer surfactants and inorganic materials such as talc. As examples, the Tegorad product lines (Tegorad are trademarks and are commercially available products of Tego Chemie, Essen, Germany) and the Solsperse product lines (Solsperse are trademarks and are commercially available products of Lubrizol Company).

When present, each additive is independently present in the energy curable compositions of the present invention in an amount of about 0.1 wt % to about 5 wt %, based on the total weight of the composition. For example the additives may each independently be present in the energy curable compositions of the present invention in an amount of about 0.1 wt % to about 1 wt %; or about 0.1 wt % to about 0.5 wt %; or about 0.5 wt % to about 5 wt %; or about 0.5 wt % to about 1 wt %; or about 1 wt % to about 5 wt %.

In certain embodiments, preferred materials include, but are not limited to, VMOX; dipentaerythritol penta/hexa acrylate (DPHA); polyester acrylate oligomer, such as CN2303 from Sartomer; aminated acrylics; photoinitiators such as bisacyl phospnine oxides, alpha amino ketones, and polymeric iso-thioxanthone; and an optical brightener. These inks exhibit excellent printability and fast cure when exposed to 395 UV LED lamps, with excellent chemical resistance as indicated by solvent rubs, compared to other commercially available UV LED inks.

Double bond conversion (DBC) is considered an important property that may influence the physical and mechanical properties of the final cured ink film. Ethylenically unsaturated monomers and oligomers contain carbon-carbon double bonds (—C=C—). DBC describes the percentage of carbon-carbon double bonds (—C=C—) that are converted to single bonds (—C—C—), or the extent to which all of the monomer or oligomer is converted to polymer, when cured. In essence, a higher conversion of double bonds may produce superior mechanical strength. The unreacted double bonds (monomer), on the other hand, may be present either as free monomer, or as pendant groups on the polymer network, which may adversely affect ink properties (e.g. migration of unreacted monomers).

EXAMPLES

The invention is further described by the following non-limiting examples which further illustrate the invention, and are not intended, nor should they be interpreted to, limit the scope of the invention.

Example 1. Technical Varnish

A technical varnish was prepared according to the formulation shown in Table 1.

TABLE 1

| Technical varnish | | |
| --- | --- | --- |
| Material | Description | wt % |
| RCX 12-191 | Inhibitor | 0.5 |
| SR-341 3-methyl 1,5-pentanediol diacrylate | Monomer | 14.0 |
| Eb. LEO 10552 Amine modified EOTMPTA | Oligomer | 10.0 |
| Mix above materials well | | |

TABLE 1-continued

| Technical varnish | | |
| --- | --- | --- |
| Material | Description | wt % |
| Omnirad 819 | Photoinitiator | 4.9 |
| PL-369 | Alpha amino Ketone | 4.9 |
| Omnipol TX | Polymeric Isothioxanthone Photoinitiator | 7.8 |
| Optiblanc PL | Optical brightener | 0.2 |
| Mix above materials to 70° C. until dissolved | | |
| CN2303EU | Oligomer | 9.8 |
| DPHA | Monomer | 44.5 |
| Byk 361N | Levelling agent | 1.0 |
| Mix above materials to 70° C. until dissolved, then cool to 45° C. and add the following material | | |
| Cerasperse UV 691 | Wax | 2.4 |
| mix well | | |
| Total | | 100.0 |

Example 1 technical varnish was used to prepare finished inks.

Examples 2 to 9. Finished Inks

Examples 2 to 9 finished inks were prepared as blends by mixing pigment dispersions (Solarverse UV Flexographic pigment dispersions, Sun Chemical Corp.) with TV-1. Inventive inks (Examples 3, 5, 7, and 9) contained VMOX, while comparative inks (Examples 2, 4, 6, and 8) did not.

Example 2 (comparative): 40% UVFQ25 Solarverse*cyan base+60% Example 1 Technical Varnish.

Example 3 (inventive): 40% UVFQ25 Solarverse cyan base+52% Example 1 Technical Varnish+8% VMOX.

Example 4 (comparative): 50% SVRS15 Solarverse yellow base+50% Example 1 Technical varnish.

Example 5 (inventive): 50% SVRS15 Solarverse Yellow base+42% Example 1 Technical Varnish+8% VMOX.

Example 6 (comparative): 46% UVFQ27 Solarverse Magenta base+54% Example 1 Technical Varnish.

Example 7 (inventive): 46% UVFQ27 Solarverse Magenta base+46% Example 1 Technical Varnish+8% VMOX.

Example 8 (comparative): 35% UVFQ46 Solarverse Black Base+3% UVFQ25 Solarverse Cyan base+4% SVRS64 Solarverse Violet base+58% Example 1 Technical Varnish.

Example 9: (inventive): 35% UVFQ46 Solarverse Black Base+3% UVFQ25 Solarverse Cyan base+4% SVRS64 Solarverse Violet base+50% Example 1 Technical Varnish+8% VMOX.

Example 10. Double Bond Conversion

Examples 2 and 3 were printed on various polypropylene films (see Table 2) using a 2.0 bcm anilox roller, and cured using GEW 16-Watt UV LED lab unit. Prints were analyzed for double bond conversion as described below.

Double Bond Conversion Test

DBC was analyzed using FTIR. A Thermo Scientific FTIR spectrometer with a diamond ATR accessory was used for collecting spectra for each ink. The ATR technique measures IR reflectance from the surface of the ink, and minimizes the contribution of the base film to the IR spectrum. The spectrum was taken by pressing the printed side of the film on the diamond crystal. For each experiment, 64 scans were taken.

For evaluating cure of the ink, the peak at 810 cm$^{-1}$ related to the acrylic moiety was used. As the ink cures, the amount of acrylate decreases and so the intensity of the 810 cm$^{-1}$ peak decreases. By referencing another peak that does not change during curing, 1720 cm$^{-1}$, a method was developed to correlate the intensity of the 810 cm$^{-1}$ to the degree of cure. The areas under the peak at 810 cm$^{-1}$ and 1720 cm$^{-1}$ were measured before curing of the ink, and after curing the ink. The ratio of the area under the peak at 810 cm$^{-1}$ to the area under the peak at 1720 cm$^{-1}$ (peak area at 810 cm$^{-1}$ peak area at 1720 cm$^{-1}$) was calculated before curing (Resin Ratio), and after curing (Cure Ratio). The DBC is calculated as [(Resin Ratio)–(Cure Ratio)/(Resin Ratio)]*100=% conversion. Results are reported as % conversion in Table 2.

TABLE 2

Double bond conversion

| Substrate | Ex. 2 (Comp.) % Conversion | Ex. 3 (Inv.) % Conversion |
|---|---|---|
| BOPP | 79.2 | 89.02 |
| PET-G | 83.5 | 92.3 |

As can be seen in Table 2, inventive Example 3, containing VMOX, exhibited superior double bond conversion (i.e. higher degree of cure) versus comparative Example 2, without VMOX. A major advantage of VMOX is that it copolymerizes with acrylates, and remains as part of the cured formulation. Without wishing to be bound by theory, the inventors hypothesize that a mechanism of action may theoretically include:

VMOX acts as an oxygen scavenger like amines.
VMOX forms an exciplex with oxygen to produce reactive radicals.
VMOX forms a donor-acceptor complex with acrylate.

Example 11. Ink Properties

The finished inks were evaluated for viscosity, cure using isopropyl alcohol double rubs, and tape adhesion. Results are shown in Table 3.

Printing

Prints on either PET-G or tube stock substrate were made using a 3 bcm anilox roller, and UV LED cured using GEW 16 Watts lamp at 100 m/min.

Viscosity

Viscosity was measured using a cone and plate viscometer (AR1500 from TA Instruments) at 25° C., using a 2 inch cone at a shear rate of 100 s-1.

Cure—Solvent Rub Resistance

Cure was assessed by measuring the alcohol rub resistance of cured prints. A cotton ball was soaked in isopropyl alcohol (IPA). The cotton ball was rubbed back and forth on the surface of the printed inks. The number of double rubs (i.e. back and forth) to removal of the ink from the substrate was counted. A higher number of double rubs indicates better cure.

Tape Adhesion

Adhesion of the inks was tested using a 4-inch strip of 3M 600 film tape. A fast peel test was performed right after cure of the ink on the substrate. The printed substrate was laid on a flat, hard surface. The tacky side of the tape was placed flat on the surface of the printed substrate. The tape was then ripped from the print by hand at a fast rate in one continuous motion, and examined for ink transfer from the surface of the printed substrate. Ink removal was assessed as a percentage of ink remaining on the printed substrate (i.e. 100% means no ink removal, and 0% means complete ink removal).

TABLE 3

Ink properties

|  | Viscosity-cps | IPA rubs (tube stock) | Tape Adhesion PET-G 3M 600 tape |
|---|---|---|---|
| Ex. 2 (comp.) cyan | 863 | 12 | 80% |
| Ex. 3 (inv.) cyan | 294 | 30 | 100% |
| Ex. 4 (comp.) yellow | 1107 | 5 | 85% |
| Ex. 5 (inv.) yellow | 666 | 12 | 100% |
| Ex. 6 (comp.) magenta | 638 | 28 | 90% |
| Ex. 7 (inv.) magenta | 316 | 34 | 100% |
| Ex. 8 (comp.) black | 1496 | 8 | 85% |
| Ex. 9 (inv.) black | 681 | 16 | 100% |

The data in Table 3 shows that VMOX will be useful in UV and UV LED systems to:
1) Improve reaction rate and double bond conversion with lower levels of photoinitiator.
2) Improve tape adhesion.
3) Lower viscosity. Lower viscosity is advantageous for high speed flexographic and gravure printing as it imparts better printability and transfer characteristics.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:
1. An energy curable composition, comprising:
(a) 1 wt % to 12 wt % vinyl methyl oxazolidinone monomer, based on the total weight of the composition;
(b) 15 wt % to 30 wt % one or more additional monofunctional and/or multifunctional ethylenically unsaturated monomers, based on the total weight of the composition; wherein 0 to 10 wt % based on the total weight of the composition are monofunctional ethylenically unsaturated monomers, and 15 wt % to 30 wt % based on the total weight of the composition are multifunctional ethylenically unsaturated monomers;
(c) 1 wt % to 30 wt % one or more acrylated oligomers, based on the total weight of the composition;
(d) 1 wt % to 20 wt % one or more photoinitiators, based on the total weight of the composition; and
wherein the energy curable composition is a finished printing ink; and
wherein the energy curable composition is curable by UV LED radiation.
2. The composition of claim 1, wherein at least one of the additional ethylenically unsaturated monomers is dipentaerythritol pentaacrylate or dipentaerythritol hexaacrylate.
3. The composition of claim 1, wherein at least one of the acrylated oligomers is a polyester acrylate or an aminated acrylic.
4. The composition of claim 1, wherein at least one of the photoinitiators is selected from the group consisting of bisacylphosphine oxide, alpha amino ketones, polymeric iso-thioxanthone, and blends thereof.

5. The composition of claim 1, further comprising 35 wt % to 50 wt % one or colorant dispersions, based on the total weight of the composition.

6. The composition of claim 1, further comprising 0.01 wt % to 2 wt % one or more optical brighteners, based on the total weight of the composition.

7. The composition of claim 1, further comprising one or more additives selected from the group consisting of adhesion promoters, silicones, light stabilizers, de-gassing additives, waxes, flow promoters, defoamers, antioxidants, stabilizers, surfactants, dispersants, plasticizers, rheological additives, and combinations thereof; wherein each additive is independently present in an amount of 0.1 wt % to 5 wt %, based on the total weight of the composition.

8. The composition of claim 1, which is suitable for flexographic or gravure printing.

9. The composition of claim 8, wherein the flexographic or gravure printing is high speed.

10. The composition of claim 1, which is suitable for use in food packaging applications.

11. A method of printing a substrate, comprising:
(a) providing a substrate;
(b) applying the composition of claim 1 on the substrate; and
(c) curing the applied composition on the substrate.

12. The method of claim 11, wherein the curing is performed by UV LED.

13. The method of claim 11, wherein the composition is applied to the substrate by flexographic or gravure printing.

14. The method of claim 11, wherein the composition is applied to the substrate by high speed flexographic or gravure printing.

15. A substrate prepared by the method of claim 11.

16. The substrate of claim 15, wherein the double bond conversion of the cured composition is equal to or greater than 80%.

17. An article comprising the substrate of claim 15.

18. The article of claim 17, wherein the article is a packaging material.

19. The article of claim 18, wherein the article is a food, pharmaceutical, or cosmetic packaging material.

20. The composition of claim 1, comprising 1 wt % to 8 wt % vinyl methyl oxazolidinone monomer, based on the total weight of the composition.

* * * * *